United States Patent
Watzke

[11] Patent Number: 6,019,552
[45] Date of Patent: Feb. 1, 2000

[54] THREAD CUTTER

[75] Inventor: Ruediger Watzke, Speikern/Neunkirchen am Sand, Germany

[73] Assignee: Emuge-Werk Richard Glimpel Fabrik fuer Praezisionswerkzeuge vormals Moschkau & Glimpel, Lauf, Germany

[21] Appl. No.: 09/085,088

[22] Filed: May 26, 1998

[30] Foreign Application Priority Data

May 28, 1997 [DE] Germany .......................... 197 22 257

[51] Int. Cl.[7] .................................................. B23G 3/02
[52] U.S. Cl. .............................................. 408/139; 192/51

[58] Field of Search ...................................... 408/139, 140; 192/51, 58.43

[56] References Cited

U.S. PATENT DOCUMENTS 3,170,552  2/1965  Mitchell ............................... 192/58.43
3,241,642  3/1966  King ..................................... 192/58.43

Primary Examiner—Steven C. Bishop
Attorney, Agent, or Firm—Jordan and Hamburg LLP

[57] ABSTRACT

A thread cutter, particularly a reversing chuck with a spindle which can be pulled out, has pressure equalizing pipelines which discharge into an equalizing chamber which is sealed from the outside air by a movable wall.

9 Claims, 3 Drawing Sheets

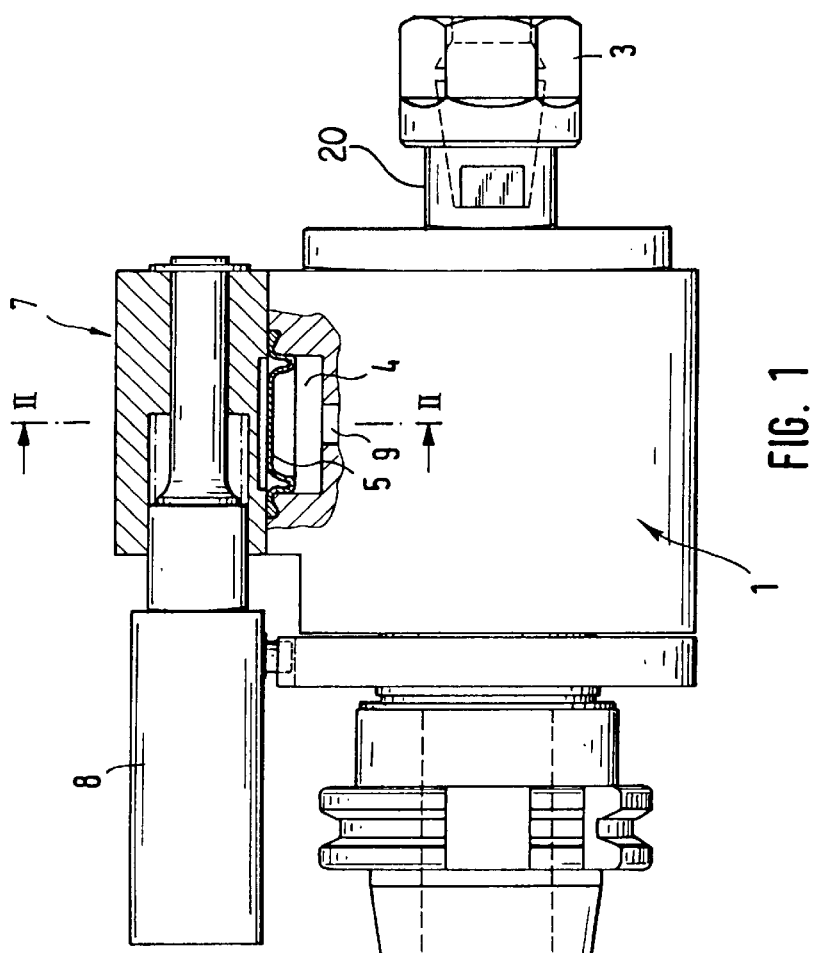
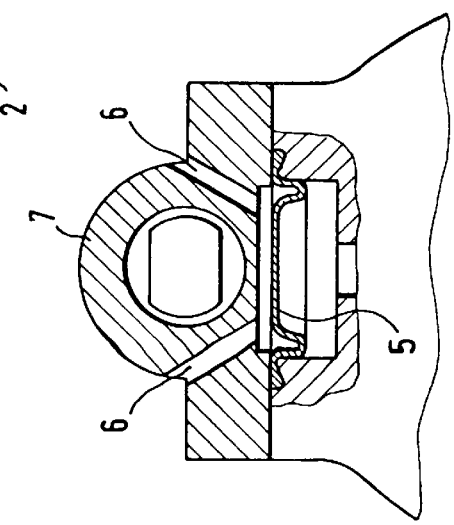
FIG. 1
FIG. 2

THREAD CUTTER

BACKGROUND OF THE INVENTION

The invention relates to a thread cutter, particularly a reversing chuck, with a spindle which can be withdrawn and inserted, and pressure-equalizing conduits.

When the spindle of such a thread cutter is pulled or withdrawn from a housing structure of the thread cutter, an underpressure is developed by means of which, in the case of the conventional construction of the pressure-equalizing conduits as continuous ventilation openings, emulsion and processing residues can be aspirated inwards. Moreover, due to such an underpressure, transmission oil can also reach parts of the thread cutter where it is not wanted.

To avoid intake of contaminants the pressure-equalization conduits may be sealed towards the outside, however, excess pressure can develop upon heating and uncontrollably shift, over piston surfaces, the zero position of the spindle even as far as into the idling or the reversing position. Moreover, switching forces are also distorted by excess pressure or underpressure.

SUMMARY OF THE INVENTION

It is therefore an object of the invention to construct a thread cutter of the initially mentioned type in such a manner, that simple pressure equalization is possible when the spindle is pulled out, but emulsion or dirt cannot penetrate from the outside.

Pursuant to the invention, this objective is accomplished by providing pressure equalization conduits that discharge into an equalizing chamber with a movable wall sealing out the outside air.

Such a movable wall can be formed, for example, by a piston, which can be shifted freely in a cylindrical equalizing chamber between stops.

Alternatively, the movable wall is formed by a rolling membrane which covers the equalization chamber.

Independently of whether the piston or the rolling membrane lies directly at the outside of the housing or is connected with the outside atmosphere via ventilation openings of an adjoining component, the desired pressure equalization is imply effected and removes the slightest danger of contamination or of distortion of the switching functions.

Further advantages, distinguishing features and details of the present invention arise out of following description of an example and from the accompanying drawings.

BRIEF DESCRIPTION OF THE DRAWINGS

FIG. 1 shows a partial sectional side view of a thread cutter;

FIG. 2 shows a section along the line II—II in FIG. 1;

DESCRIPTION OF THE PREFERRED EMBODIMENTS

Figure 3:
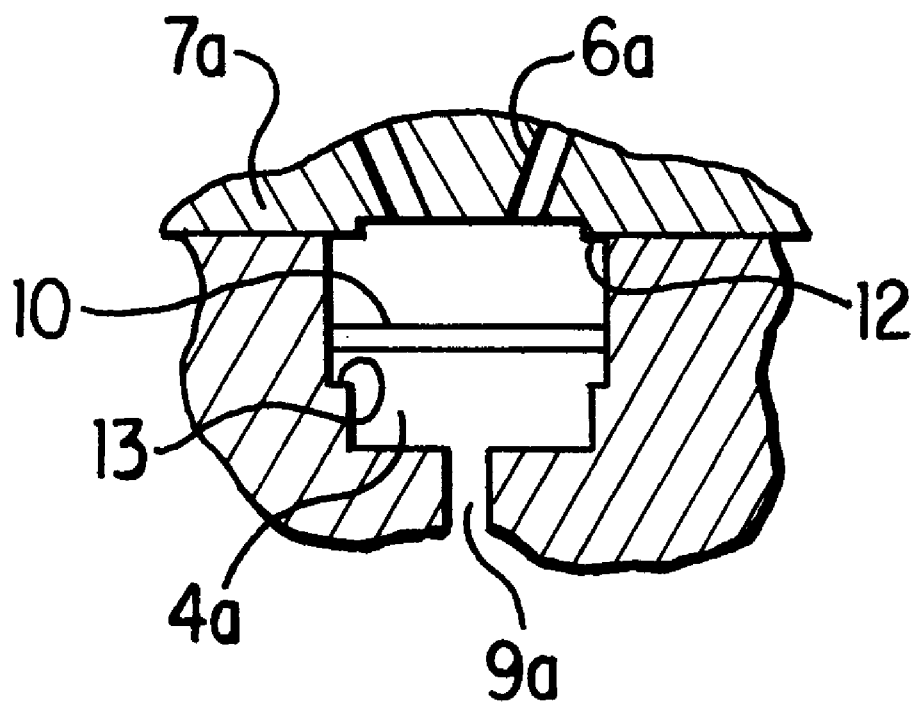
FIG. 3 shows a partial sectional side view of an alternative thread cutter.

Referring to FIGS. 1 and 2, a thread cutter, particularly a reversing chuck, has a spindle 20, which can be withdrawn from and inserted into a thread cutter housing structure 1 of the thread cutter, and which is in driving connection with a shaft 2 for accommodation in a machine tool. A grip head 3 for the thread cutter is fastened at the front of the spindle 20.

Cavities, such as various chambers and boreholes in the interior of the sealed thread cutter housing 1 discharge via a pressure equalizing conduit 9 into a pressure equalizing chamber 4, which is closed off from the ambient atmosphere, in the example shown, by a rolling membrane 5, which in turn is connected with the ambient atmosphere via ventilation openings 6 in a stop arm 7. A fastening bolt in the machine tool is labeled 8.

Whether there is an underpressure in the interior of the sealed thread cutter housing 1 due to the fact that the spindle has been pulled out, or an overpressure due to thermal heating, complete pressure equalization is possible via the movable rolling membrane 5 and the ventilation boreholes 6 without any possibility that dirt, which could over time even bring the thread cutter to a halt, could gain entrance into the thread cutter from the outside.

The invention is not limited to the example shown. As described above, the rolling membrane 5 could also be replaced by a piston, the movement of which is limited between stops in the equalization chamber 4, which advisably should be constructed rotationally cylindrical for this purpose. For example, FIG. 3 shows a cylindrical equalizing chamber 4a, a pressure equalizing conduit 9a, a cylindrical piston 10 in the pressure equalizing chamber 4a, ventilation boreholes 6a, and stops 12, 13 which limit the movement of the piston 10 in the equalizing chamber 4a.

Figure 4:
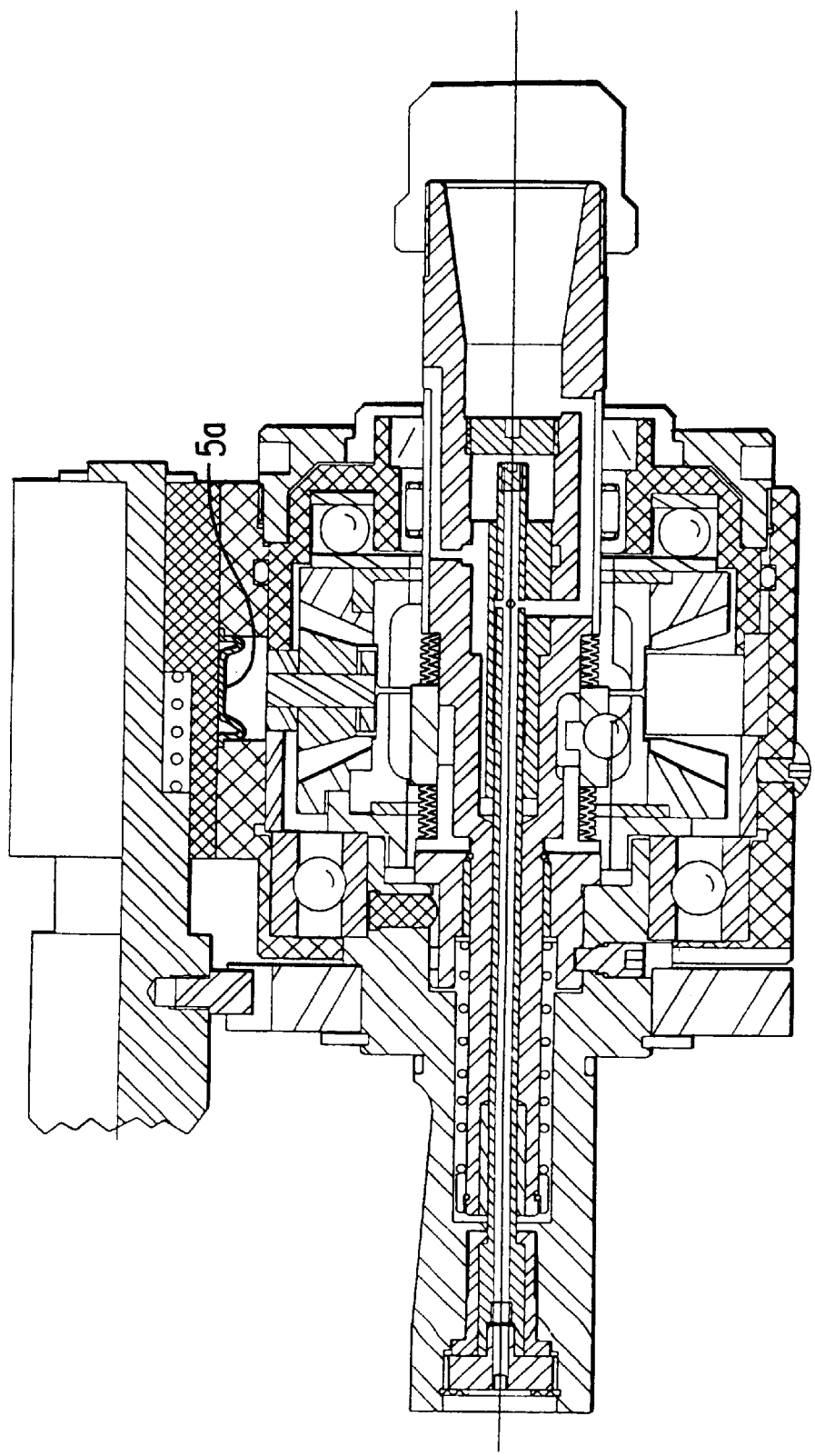
FIG. 4 shows a cross-sectional view of an inventive thread cutter.

Alternatively, the thread cutter of the present invention may include a pressure equalizing device as shown in FIG. 4 wherein the membrane 5a in FIG. 4 is operable like the membrane 5 shown in FIG. 1.

The internal structure of the thread cutter is basically known, except for the structure and arrangement of the present invention as described hereinbefore and as shown in the drawings. Accordingly, such known internal structure is not described in detail.

What I claim is:

1. A thread cutter having a housing structure movably housing a spindle in a cavity for permitting the spindle to move from and into said cavity wherein said housing structure defines a pressure equalizing conduit communicating with said cavity, comprising:

said housing structure having an equalizing chamber in communication with said pressure equalizing conduit and the ambient atmosphere; and a moveable wall disposed in said equalizing chamber freely moveable so as to seal said pressure equalizing conduit from the ambient atmosphere while permitting substantially unrestrained displacement of an amount of air between said cavity and said equalizing chamber thereby preventing overpressure and underpressure in said cavity and shift of a zero position of said spindle and distortion of switching forces.

2. A thread cutter according to claim 1 wherein said equalizing chamber is a cylindrical chamber having a central axis, stops in said cylindrical chamber spaced from one another in a direction parallel to said central axis, and said moveable wall is a piston freely moveable in said cylindrical chamber between said stops so as to permit said substantially unrestrained displacement of the amount of air between said cavity and said equalizing chamber.

3. A thread cutter according to claim 1 wherein said moveable wall is a flexible member for permitting said substantially unrestrained displacement of the amount of air between said cavity and said equalizing chamber.

4. A thread cutter according to claim 3 wherein said moveable wall includes an elastomeric material.

5. A thread cutter according to claim 1 wherein said moveable wall includes a flexible member having a portion with a generally U-shaped cross-sectional configuration.

6. In a thread cutter of the type having a housing structure movably housing a spindle in a cavity for permitting the spindle to move from and into said cavity wherein said housing structure defines a pressure equalizing conduit, the improvement comprising:

said housing structure having an equalizing chamber in communication with said pressure equalizing conduit and the ambient atmosphere; and a moveable wall disposed in said equalizing chamber freely moveable so as to seal said pressure equalizing conduit from the ambient atmosphere while permitting substantially unrestrained displacement of an amount of air between said cavity and said equalizing chamber thereby preventing overpressure and underpressure in said cavity and shift of a zero position of said spindle and distortion of switching forces.

7. In a thread cutter according to claim 6 wherein said equalizing chamber is a cylindrical chamber having a central axis, stops in said cylindrical chamber spaced from one another in a direction parallel to said central axis, and said moveable wall is a piston freely moveable in said cylindrical chamber between said stops so as to permit substantially unrestrained displacement of the amount of air between said cavity and said equalizing chamber thereby preventing shift of a zero position of said spindle and distortion of switching forces.

8. In a thread cutter according to claim 6 wherein said moveable wall is a flexible member for permitting said substantially unrestrained displacement of the amount of air between said cavity and said equalizing chamber.

9. In a thread cutter according to claim 6 wherein said moveable wall includes an elastomeric material.

* * * * *